3,180,147
INSTRUMENT FOR THE MEASUREMENT OF TEMPERATURE
Herbert Bruce William Holt, Surbiton, and Peter Dorée Saw, Staines, England, assignors to Tyer and Company Limited, Guildford, England, a British company
Filed May 31, 1961, Ser. No. 113,791
6 Claims. (Cl. 73—339)

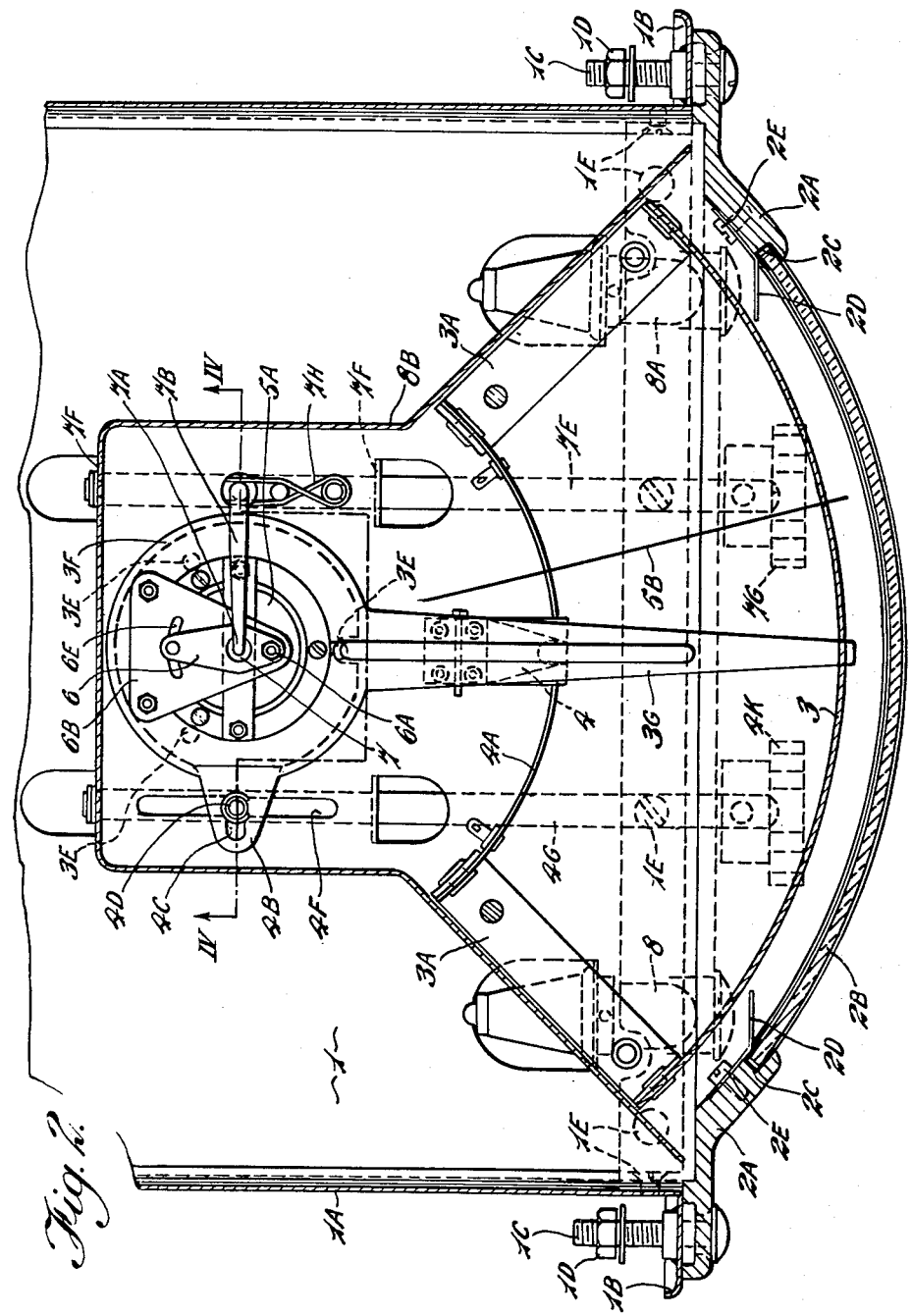

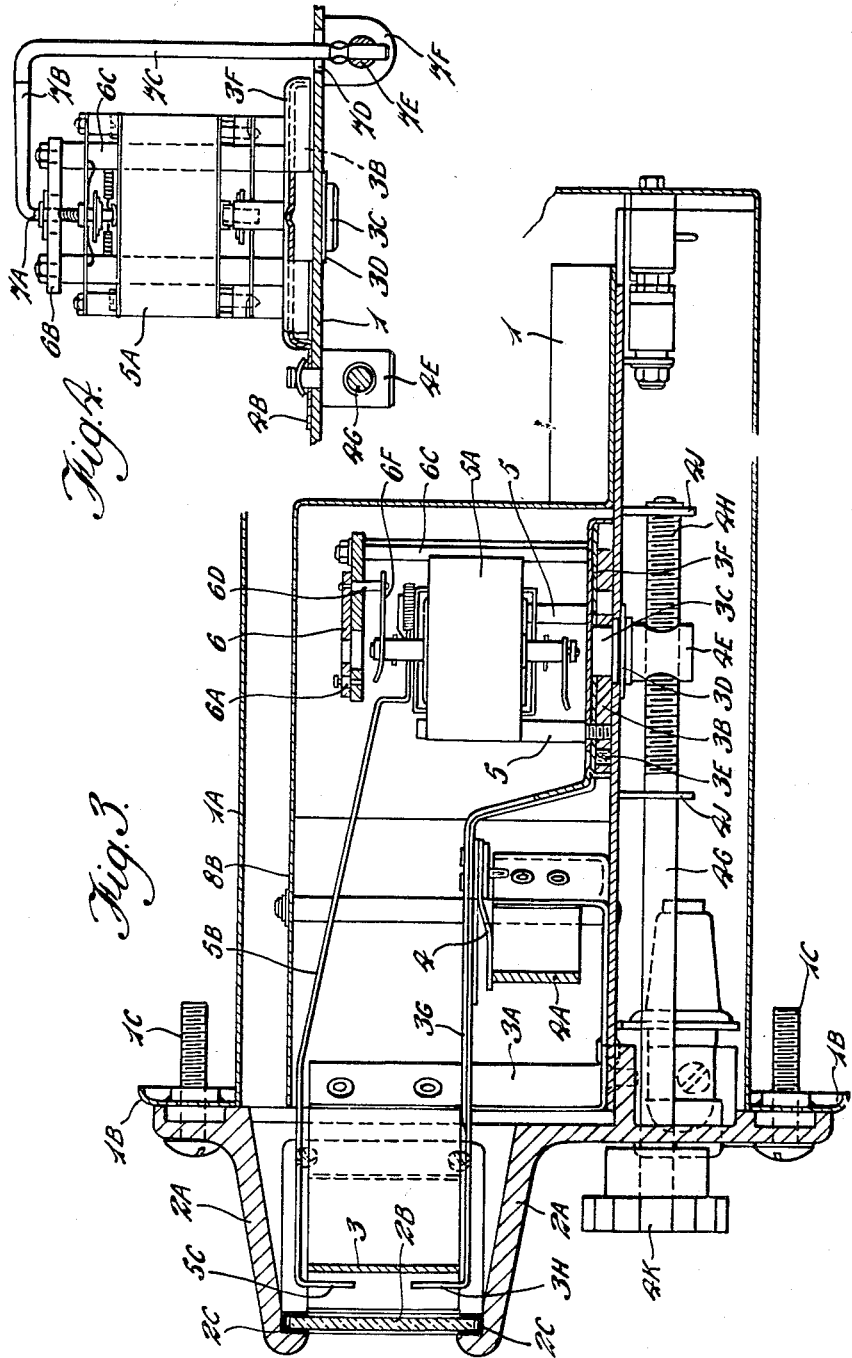

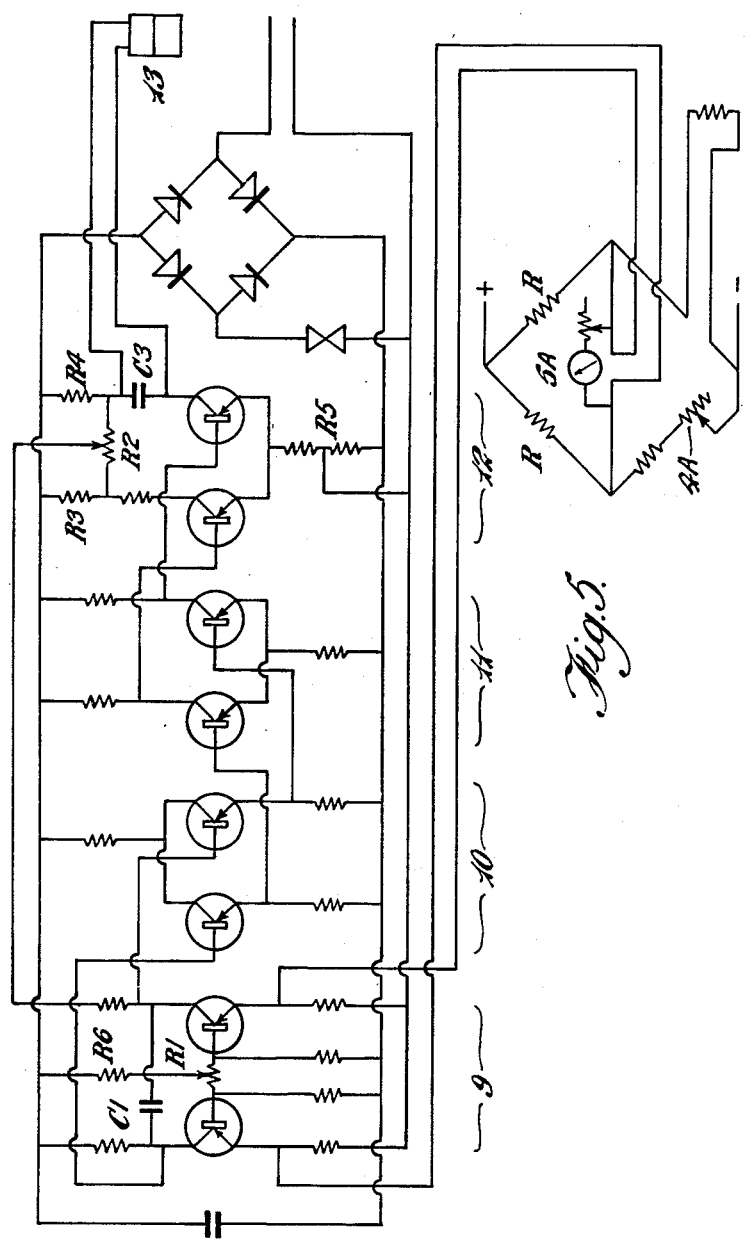

This invention relates to a temperature control and indicating device.

The principal object of this invention is to provide a device for controlling temperature according to the dictate of a temperature sensing element, the device indicating that the sensing element is at the required temperature or above or below it. The device also provides for the pre-determination of the temperature of the sensing element at which the temperature controlling means will operate.

Known devices for controlling temperature employ the property of dissimilar metal junctions (thermocouples) whereby electrical potentials are developed in the junctions when they are heated, the values of the potentials being related to the temperatures of the junctions, so that temperatures can be indicated by means of a millivoltmeter connected across a thermocouple, the millivoltmeter being scaled in degrees of temperature. Such a device is self-contained as only changes of temperature affect the millivoltmeter pointer position. The output voltage of a thermocouple for a small change of temperature is very small indeed so that, in order to record slight changes of temperature, a very delicate millivoltmeter is necessary. The use of such a device for controlling temperature by operating a relay at a predetermined position of the meter pointer, requires that a means for detecting the exact position of the pointer without in any way restricting its movement is necessary. Since the output of a thermocouple is small for, say, 1° C. change of temperature, a device as previously described cannot be made very sensitive. An amplifier could be interposed between the thermocouple and the meter, but if this is done, the power supply to the amplifier must be quite stable, otherwise variations in the supply voltage will affect the pointer positions of the meter.

It is also known to provide a more sensitive temperature measuring device which employs the electrical resistance changes which occur in metals according to variation in temperature. In its simplest form, the instrument comprises a millivoltmeter connected with a sensing element consisting of a length of metallic wire, for instance, nickel or platinum, wound into a compact form and a battery connected in series with the sensing element and the meter, the change of resistance of the wire due to temperature variations being measured as a change of current by the meter. In order that accurate readings may be made, it is essential that the battery voltage should be constant, or if the source of electricity is the supply mains, some means for ensuring a constant voltage supply to the sensing element and meter is imperative.

It will be clear that the difficulty of providing a constant voltage input to a resistance type temperature indicating device can be overcome by employing a Wheatstone bridge in which the sensing element comprises one arm of the bridge and a variable resistance another arm. This arrangement has the advantage that for equally sensitive temperature measurement the meter can be less sensitive and more robust than that used with a thermocouple, the values of the resistances in the bridge and the supply voltage being chosen to provide adequate out of balance voltages to drive the meter. It is necessary with this arrangement to balance manually the bridge in order to read the temperature of the sensing element.

According to this invention an instrument for controlling and indicating temperature comprises a resistance bridge one arm of which is variable according to changes in temperature, means whereby one resistance of the bridge may be adjusted in value and to a setting corresponding to a required temperature, and indicating means operable by out-of-balance potentials across the bridge, the indicating means aligning with the said setting when the bridge is in balance thereby providing a null point from which deviations of the indicating means indicate variations from the required temperature.

More particularly the invention comprises an instrument for controlling and indicating temperature comprising a resistance bridge one arm of which forms a temperature sensing element, a pointer angularly displaceable about a centre and adapted to vary one of the resistances of the bridge, the pointer indicating a required temperature, a millivoltmeter having a pointer angularly displaceable about the said centre, the meter being operable by out-of-balance potentials set up by the bridge, the two pointers aligning when the bridge is in balance thereby providing a null point from which deviations of the pointer of the meter indicate variations from the required temperature.

The means for continually indicating the temperature may comprise a centre zero millivoltmeter connected across the bridge. The arrangement of the meter mounting is such that correct indication of the temperature at which control is effected is automatic, irrespective of the voltage of the power supply. To read accurately temperatures other than that at which control is effected necessitates manual balancing of the bridge.

The resistance of the wire used in sensing elements increases with temperature rise over a portion of the temperature spectrum. Therefore, by setting the balancing resistance to a value greater than the sensing element resistance at room temperature, and then applying a D.C. supply to the bridge, a potential is produced across the bridge which will become reduced as the sensing element is heated, reaching zero when the element resistance is equal to the balancing resistance and increasing again, but in the opposite direction, as the element is heated further. As will be seen, at any point close to either side of the balance or "null" point, a small potential exists which will be either positive or negative according to the temperature of the sensing element. This out-of-balance potential is used to operate a relay via a suitable amplifier whereby means can be actuated to control the temperature. By suitably designing the amplifier, it can be made sensitive to out-of-balance potentials produced by extremely small temperature changes of the order of 0.1° C.

In industry, the control of temperature is a common requirement and the facility to set the temperature control device to a definite temperature and to determine whether there is any deviation from that temperature are the main features to be expected in such a device other than the capacity for close limit and stable control.

The instrument according to the invention fulfills these requirements and avoids the need for manual adjustment for measuring using a D.C. bridge without a stabilised supply voltage, or a motor-operated self balancing arrangement, bearing in mind that a user only requires to know whether the set temperature has been reached or exceeded and not by exactly how much the recorded temperature deviates from the set temperature.

In order that the invention may be clearly understood it will now be described more fully, by way of example, with reference to the accompanying drawings, in which:

FIGURE 2 is a section on line II—II of FIGURE 1;

FIGURE 3 is a section on line III—III of FIGURE 1;

FIGURE 4 is a section on line IV—IV of FIGURE 2, and

FIGURE 5 is a circuit diagram of the amplifier and bridge for use with the device.

Figure 1:
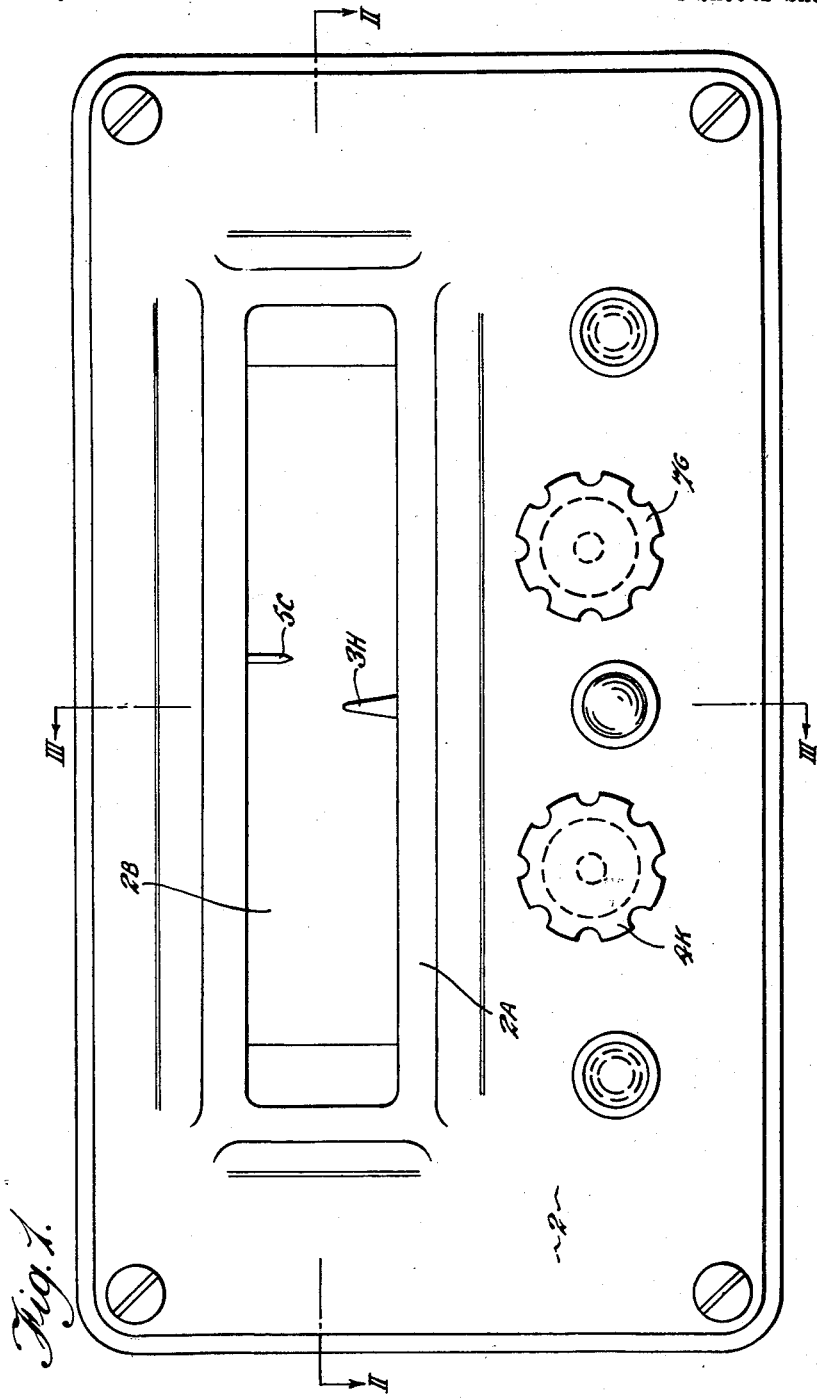
FIGURE 1 is a front elevation of a device in accordance with the invention.

Referring to the drawings, the components of the device, excepting the sensing element, are mounted on a chassis 1 housed within a casing 1A. Fixed to the chassis by screws 1E is a front panel 2. An arcuate projecting portion 2A of the panel has a window 2B the edges of which are fitted in rebates 2C formed in the portion. The window is held in place by side wings 2D fixed to the portion by screws 2E. Concentric with the window and spaced from it is a scale 3 (FIGURE 2), which is secured at its ends to brackets 3A fixed to the chassis 1. The scale may be calibrated as required, for instance, it may be calibrated 0 to 30 corresponding to degrees centigrade. A disc 3B is rotatably mounted on the chassis by a central spigot 3C which projects through a hole in the chassis, the disc and its spigot being retained in place by a spring circlet 3D which engages in an annular groove in the spigot. The disc 3B has three holes in each of which is a leather pad 3E one of the pads being shown in FIGURE 3. The pads engage the chassis and frictionally retard the rotation of the disc. Fixed to the disc 3B, in a manner which will later be described, is a circular flanged plate 3F and formed with the plate is a pointer 3G. One end of the pointer is bent upwardly as at 3H to read against the scale 3, it being understood that the scale and window are both described from the centre of the disc 3B. Fixed to the pointer and insulated is a wiping contact 4 which contacts an arcuate resistance 4A concentric with the scale, the resistance constituting the manually adjustable balance resistance of the Wheatstone bridge.

Formed with the flanged plate 3F is a lug 4B having a slot 4C into which projects a pin 4D formed on a nut member 4E disposed below the chassis, the pin projecting through a slot 4F in the chassis. Engaging the nut member is a rod 4G which is screw threaded as at 4H and which is rotatably mounted in downturned lugs 4J in the chassis. The rod extends through a hole in the front panel 2 and the projecting end of the rod is fitted with a knob 4K. It will be seen that by turning the knob, a fine adjustment of the pointer over the scale can be made.

Supported above the disc 3B by pillars 5 is a centre zero millivoltmeter 5A the spindle of which coincides with the centre of the disc. The lower ends of the pillars are reduced in diameter to form shoulders the reduced parts being screw threaded for screwing into the disc 3B. The shoulders serve to clamp the circular flanged plate to the disc 3B. The meter has a pointer arm 5B which extends above the scale and which has one end bent downwardly as at 5C to read against the scale.

In common with all moving coil meters, it is necessary to provide for the zeroing of the millivoltmeter. Such provision may comprise a lever 6 pivotally mounted as at 6A to a plate 6B which is supported on pillars 6C fixed to the disc 3B. The lever has a pin 6D which is received in an arcuate slot 6E in the plate, the lower end of the pin engaging an arm 6F connected to the outer end of the upper return hairspring of the millivoltmeter coil suspension system. In the lever is a hole 7 concentric with the spindle of the meter. Projecting into the hole is a downturned end 7A of an arm 7B of an L-shape member 7C. The lower end of the member projects through a hole 7D in the chassis where it is fixed to a rod 7E rotatably mounted in downturned lugs 7F. The rod extends through the front panel 2 and is fitted with a knob 7G. Where the member 7C passes through the base plate, it is embraced by an elongated spring loop 7H which serves to maintain the end 7A of the arm 7B coincident with the axis of the meter. It will be seen that, by turning the knob 7G in one direction or the other, the member 7C will be angularly displaced in a vertical plane against the action of the spring loop 7H, which movement will be transmitted to the lever 6 which in turn will rotatably displace the spindle of the meter for zeroing. The diameter of the hole 7 is such that the pointer 3H can be moved over the scale without interfering with the zeroing means previously described. It is to be understood that the plate 6B together with the meter move bodily with the pointer. Thus, the zeroing operation may be performed irrespective of the position of the pointer.

The casing 1A has a flange 1B with screwed studs 1C projecting through it at each corner. The casing can be inserted into an aperture in an instrument panel and secured by nuts on the studs. For making connections between the device and other electrical equipment terminals are provided outside the casing at the back, the terminals being connected to plugs inside the casing for co-operation with sockets on the chassis, the chassis being arranged to slide into the casing and to be secured by nuts 1D on the studs 1C. This arrangement enables the chassis to be removed for servicing.

Conveniently, the electrical components of the instrument such as a relay or relays, amplifier or amplifiers and the remaining components of the bridge system may be plugged into sockets mounted on the chassis.

In order to give protection to the millivoltmeter and its pointer, a removable cover 8B may be provided.

Assuming that an electric power supply is connected to the bridge and that the sensing element is suspended in a room and that the adjustable pointer is set at the temperature of the room, the bridge will be balanced and the meter pointer will line up with the manually adjustable pointer. With the bridge thus balanced, the meter pointer will be at "null" point and will accurately indicate the room temperature, irrespective of the voltage supply to the bridge. If the sensing element is left suspended in the room and the adjustable pointer is moved to read a higher temperature on the scale, an out of balance potential will be produced across the bridge which deflects the meter pointer back to the room temperature on the scale. If the sensing element is now heated above that of the room temperature, the out-of-balance potential will be reduced until it becomes zero when the point at which the adjustable pointer has been set will be reached. Since the meter will be at "null" point, the correct temperature will be indicated. Further heating of the sensing element will produce an out-of-balance potential of reverse polarity with the result that the meter pointer will move over the scale to a position indicating a temperature higher than that to which the adjustable pointer has been set. At temperature higher or lower than the set temperature, the meter pointer position will vary according to fluctuations of the voltage of the supply to the bridge, but this is of no great consequence since in most cases, it is only necessary to know whether the indicated temperature is above or below the value to which the adjustable pointer has been set.

The controlling part of the device operates as follows. The out-of-balance potentials developed in the bridge when the sensing element temperature is above or below the value set by the adjustable pointer are of the order of 0.4 millivolt corresponding to differences of 0.1° C. Thus, in order to operate a relay when the sensing element temperature departs from the set value, say by 0.1° C., an amplifier is necessary and it is desirable that the amplifier should have certain features as follows: The overall gain must be such that a small potential change, corresponding to a temperature change of 0.1° C., can be amplified sufficiently to give the necessary current change in the relay coil to produce positive operation of the relay contacts. The amplifier must also be sensitive to the polarity of the potential changes in the bridge, but not sensitive to alternating potentials, particularly at 50 c.p.s. Further, the sensitivity must not be affected to any degree by changes in the voltage of the supply to the amplifier which must not present a widely varying load on the bridge. Conveniently, transistors may be used for the amplifying circuit and the effects of temperature change on the transistors must not modify the response of the relay to the out-of-balance potentials developed by the bridge.

Referring to FIGURE 5 a suitable amplifier for use with the instrument comprises four balanced push-pull stages 9, 10, 11 and 12 using transistors, the output from the bridge being connected to the emitters of the first pair 9 of the transistors and the millivoltmeter connected in parallel. A relay 13, for actuating means to control the temperature is connected in series with the collector of one of the transistors of the last stage 12. With the input open circuited, or short circuited, it will be apparent that equal currents will flow in each collector circuit of the last stage and that when the bridge is in balance equal currents will also flow in the output collector circuits. When, however, a change of temperature in the sensing element occurs, the currents in the output stage collectors will vary, the current in one collector increasing and the other decreasing. Providing that the polarity of the bridge output is correct, any cooling of the sensing element will increase the current in the emitter of one transistor and the relay and decrease in the emitter of the other transistor in the output stage 12 of the amplifier. For positive operation of the relay 13 it is desirable that the slightest cooling of the sensing element shall produce a complete change of relay current from zero to the maximum possible and to ensure that this takes place, a special form of feed-back is introduced.

In the collector circuits of the transistors of the output stage are two load resistances R3 and R4 and connected across the resistance is a potentiometer R2. At a point near the centre position of the potentiometer slider there is no voltage change with varying potentials applied to the amplifier input terminals, but there will be small potentials of one polarity or the other on either side of this point. The slider is connected to feed the collector load of one of the transistors in the input pair 9 and adjustment of the slider to either side of the no volts position effectively produces positive or negative feedback. With the slider adjusted to provide positive feedback there is little tendency for the system to oscillate since there are few elements in the amplifier to produce phase shifts. There is, however, a strong tendency for the circuit to hold strongly in a position thereby maintaining the current in the emitter of the output transistor which current was increased by the change of potential at the input terminals of the amplifier. Adjustment of the slider of the potentiometer towards the negative direction slowly reduces the "hold-over" effects until it disappears at the zero feed-back position when the circuit becomes an extremely high gain amplifier. At this point there may be a tendency for the circuit to hunt or oscillate as is inherent in any high gain feed-back system. Further movement of the slider to give negative feed-back has the effect of reducing the overall gain of the amplifier, but it is not intended that negative feed-back should be used in this application.

It will be appreciated that the use of varying degrees of positive feed-back enables an adjustable differential in the relay to be achieved. This is a desirable feature since the sensitivity of the circuit can be reduced whilst a positive action of the relay is maintained.

In order to offset any drift which may occur due to ageing or heating of the transistors, substantially 100% negative D.C. feed-back, in phase, is used. The feedback voltage is taken from a resistor R5 in the common emitter circuit of the last amplifier stage and is applied to the emitters of the first amplifying pair of transistors.

Connected across the collectors of the first stage of the amplifier is a capacitor C1 which serves to minimize hum pick-up.

It is desirable that the first stage of the amplifier should be accurately balanced. This is done by a potentiometer R1 which is connected between the bases of the transistors, the slider being connected to the negative line via a resistor R6. This balance adjustment in the first stage also serves another purpose which will be described later.

The whole amplifier may be built into a printed circuit panel with its own rectifier, smoothing capacitor, and a capacitor C3 which provides a slight slugging of the relay. It is preferred that the panel should be plugged into the chassis of the device.

The bridge is also provided with its own rectifier and smoothing capacitor and, apart from the balancing resistance 4A which is mounted on the chassis, is also built on a printed circuit panel adapted to be plugged into the chassis. It will be understood that, by changing the bridge fixed arm ratio on different panels, different ranges of temperature adjustment can be made by changing the bridge panels.

For certain special applications of the device, two amplifiers may be connected to one bridge so that two relays are available. It may be required to arrange that one relay operates at a slightly different temperature from the other so that a part of the heating energy can be switched off before the required working temperature is reached and the remaining heating load switched by the other relay when the working temperature is achieved. It is possible to upset, within small limits, the balance of the input stage of one of the two amplifiers so that its relay operates at a lower temperature than the other, by adjustment of the balance potentiometer R1 previously referred to.

We claim:

1. An instrument for controlling and indicating temperature comprising a Wheatstone bridge circuit, one arm of the bridge being disposed in a temperature sensing element, another arm of the bridge having a manually adjustable element, a pointer operable by the said element for indicating a required temperature against a fixed scale, a millivoltmeter movable with the said element and operable by out-of-balance potentials set up in the bridge, the millivoltmeter having a pointer reading against the said scale to indicate the said potentials, the two pointers aligning when the bridge is in balance and differences in the readings of the pointer on the scale indicating variations from the required temperature, a relay operated by the said potentials through the medium of an amplifier for controlling temperature, an adjustable pre-set resistance in one of the arms of the bridge for varying a predetermined range of temperature over which the instrument operates, and zeroing means for the millivoltmeter operable independently of the said manually operable element for adjusting the resistance of the said another arm of the bridge.

2. An instrument for controlling and indicating temperature according to claim 1 wherein the components of the instrument are mounted in a chassis and housed in a casing adapted to be inserted in a cabinet or panel the casing being provided with electrical coupling means so that withdrawal of the instrument from the casing is facilitated.

3. An instrument for controlling and indicating temperature according to claim 1, wherein an amplifier is provided to amplify the said potentials to improve the switching operation of the relay, the amplifier including adjustable positive feedback whereby an adjustable differential may be obtained in the operation of the said relay.

4. An instrument for controlling and indicating temperature according to claim 3 wherein the amplifier comprises a plurality of stages in each of which a pair of transistors are arranged in a balanced push-pull arrangement, the relay being connected in series with the collector of one of the transistors in the last stage.

5. An instrument for controlling and indicating temperature according to claim 4 wherein the first stage of the amplifier is accurately balanced by a potentiometer connected between the bases of the pair of transistors in the stage, the slider of the potentiometer being connected to the negative line of the circuit through a further resistor.

6. An instrument for controlling and indicating temperature according to claim 5 wherein two amplifiers are connected to a common bridge, the output from the amplifiers each energizing a relay, the balance of the said first stage of one of the amplifiers being upset by adjusting the said potentiometer slider, whereby the relays operate at different temperatures.

References Cited in the file of this patent
UNITED STATES PATENTS

| | | |
|---|---|---|
| 1,791,563 | Horn | Feb. 10, 1931 |
| 2,994,832 | James | Aug. 1, 1961 |

FOREIGN PATENTS

| | | |
|---|---|---|
| 568,676 | Great Britain | Apr. 16, 1945 |

OTHER REFERENCES

Malmberg & Matland (Publication), The Review of Scientific Instruments, volume 27, Number 3, March 1956, pages 136–139 relied on.